Figure 1:
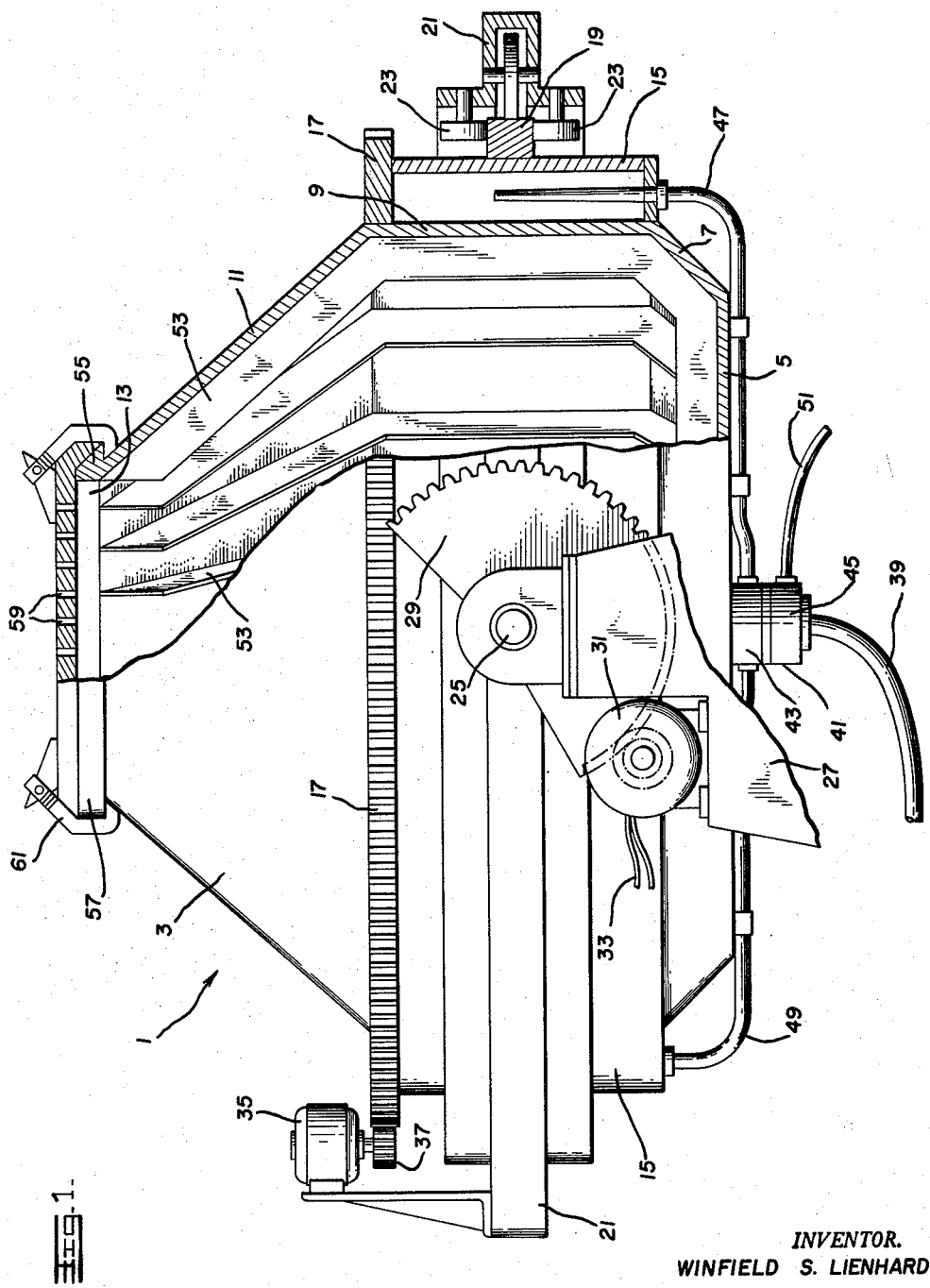

Oct. 13, 1964  W. S. LIENHARDT  3,152,888
PROCESS FOR DETINNING
Filed July 30, 1959  2 Sheets-Sheet 1

INVENTOR.
WINFIELD S. LIENHARDT
BY Robert J Patin
ATTORNEY

Oct. 13, 1964     W. S. LIENHARDT     3,152,888
PROCESS FOR DETINNING
Filed July 30, 1959     2 Sheets-Sheet 2
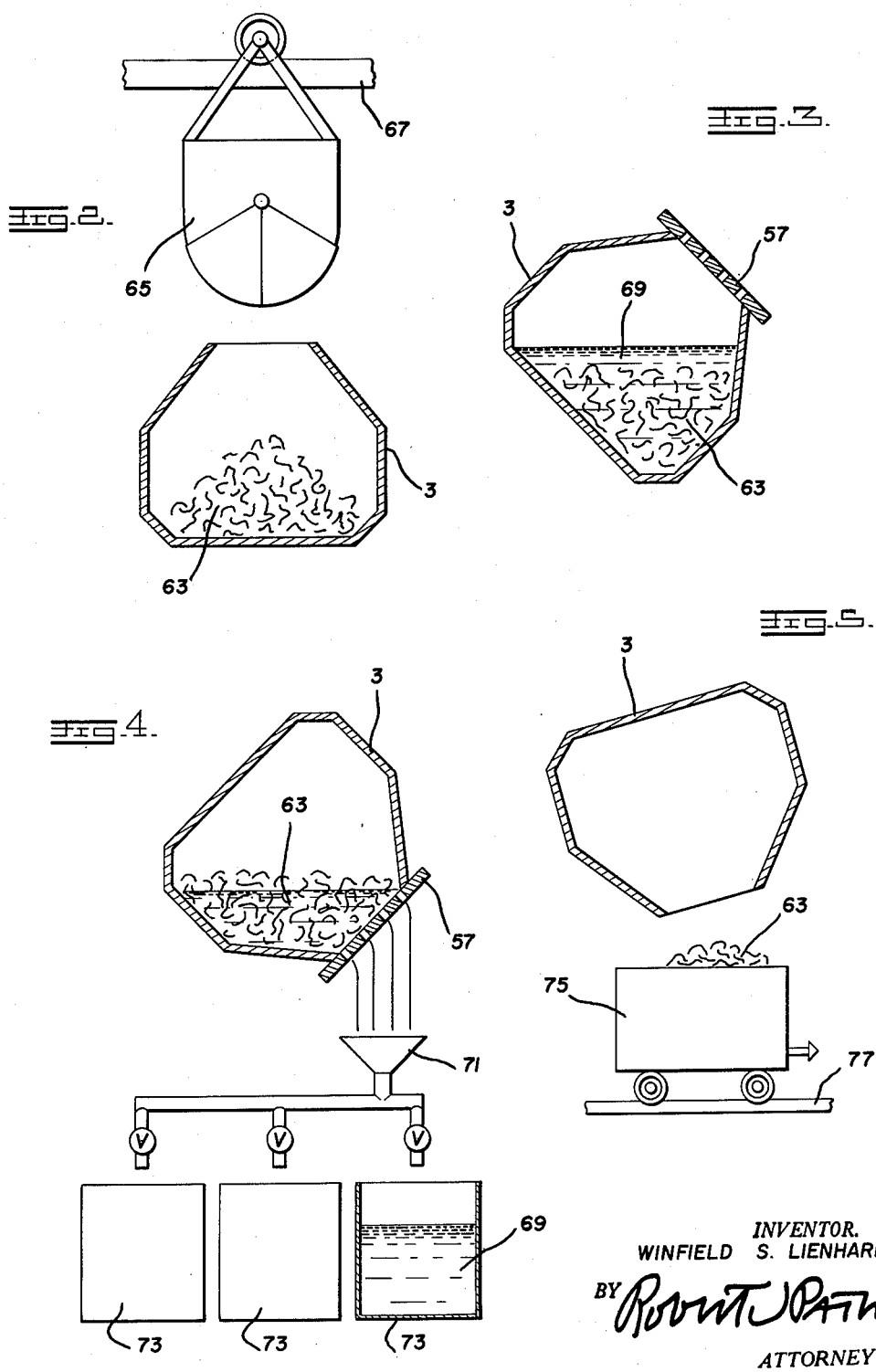
INVENTOR.
WINFIELD S. LIENHARDT
BY *Robert J. Patin*
ATTORNEY

United States Patent Office 3,152,888
Patented Oct. 13, 1964

3,152,888
PROCESS FOR DETINNING
Winfield S. Lienhardt, Short Hills, N.J., assignor, by mesne assignments, to M & T Chemicals Inc., New York, N.Y., a corporation of Delaware
Filed July 30, 1959, Ser. No. 830,552
6 Claims. (Cl. 75—98)

The present invention relates to hydrometallurgical processes for recovering metallic coating substances from coated materials, more particularly by contacting the material with a stripping solution.

The invention will be illustrated by way of example in connection with the recovery of tin from tin-coated scrap.

In the detinning of scrap, for example, such as sheet iron and sheet steel having a coating of metallic tin, it has long been conventional to employ a caustic soda detinning process such as that disclosed in Buttfield United States Patent No. 1,511,590, October 14, 1924. In such processes, tin-coated scrap such as scrap tin plate is placed in a large metal openwork basket and lowered into a tank of alkaline detinning solution, in which the tin is removed from the scrap and converted into sodium stannate. The detinned scrap is withdran from the solution and rinsed and in due course is returned to a furnace as iron or steel scrap. The detinning solution containing the sodium stannate is suitably treated to recover its tin content.

In a caustic solution such as a caustic soda solution, oxygen must be present in some form in order to oxidize the tin. A portion of this oxygen is made available by including in the solution oxidizing agents such as a nitrate or nitrite, for example, sodium nitrate or sodium nitrite, or both. The necessary oxygen is provided in part by this agent and in part by the feeble galvanic current set up in the couple formed by the tin and the iron. This galvanic current decomposes water and releases oxygen at the anode (tin) and hydrogen at the cathode (iron). Thus, the simultaneous reactions that take place are probably as follows:

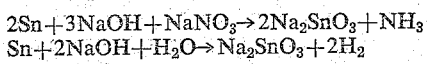

$$2Sn + 3NaOH + NaNO_3 \rightarrow 2Na_2SnO_3 + NH_3$$
$$Sn + 2NaOH + H_2O \rightarrow Na_2SnO_3 + 2H_2$$

The alkaline agent such as sodium hydroxide is consumed in and is necessary for both of these reactions. As the reactions proceed for a given batch of scrap or for various batches, the caustic is progressively consumed and must from time to time be replenished. Naturally, caustic replenishment is a factor in the expense of the cycle, and in certain causes consumes a portion of the time required to perform the cycle.

Unfortunately, the caustic is consumed not only in the intended reactions of the process, but also in an unintended reaction with carbon dioxide of the atmosphere. This undesired reaction proceeds as follows:

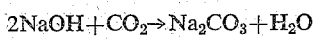

$$2NaOH + CO_2 \rightarrow Na_2CO_3 + H_2O$$

The sodium carbonate comprises an accumulating contaminant in the solution and must be removed from time to time.

Accordingly, it is an object of the present invention to provide hydrometallurgical processes for removing metallic coating substances from coated material, such as detinning scrap, in which the stripping solutions are protected from destruction caused by atmospheric constituents, such as carbon dioxide.

In the past, the problem of carbon dioxide contact with the detinning solution has been largely avoided by keeping carbon dioxide as much as possible out of contact with the solution. The openwork baskets in which the scrap is immersed in the tanks of solution are rotated about their horizontal axes to cause the solution continuously to wash the plated surfaces of the scrap. If any portion of the rotating basket were to extend above the surface of the solution, air would be entrained in the solution and the carbon dioxide in that air would react with the caustic. Therefore, it is the usual practice to immerse the baskets completely in the solution, so that the baskets rotate entirely within the solution.

Naturally, this requires a great deal of solution, the volume of the solution in the case of a cylindrical basket, for example, being usually about 2.7 times the volume of the basket. When it is remembered that the basket may contain a charge of, say, 25 tons of scrap, it will be obvious that the quantity of solution that must be pumped, heated and otherwise handled is indeed formidable, particularly in those instances in which the basket remains in the tank between stripping and rinsing steps and the stripping and wash solutions are successively pumped into and out of the tank.

Therefore, another object of the present invention is the provision of such methods, which involve the use of relatively little stripping solution.

The problem of handling large quantities of stripping solution was approached in the past by providing multiple process tanks. The basket carrying the scrap was immersed in the stripping tank, raised to drain, and moved to the first of a series of rinse tanks. In effect, it was the scrap that was manipulated, not the liquid. This, of course, necessitated the provision not only of a plurality of process tanks, each with its own fluid handling and treating equipment, but also of a conveyor and hoist system integrated with the process tanks.

Hence, a further object of the present invention is the provision of such methods, which may require the use of only a single process vessel.

Another problem in the removal of coating materials from solid substrates results from the practice of applying to the metallic coating a further protective coating which will not be destroyed by agents destructive to the main or base coating. In the case of tin plate, a protective coating of lacquer is often applied. The lacquer protects the tin plate when the material is in use; but unfortunately, it also protects the tin plate during the detinning operation, with the result that the detinning operation is hindered. Also, when the lacquer finally dislodges from the scrap, it settles to the bottom of the tank in flakes and particles to form a lacquer sludge which must periodically be removed to prevent such accumulation as would interfere with the process.

Therefore, it is yet another object of the present invention to provide such methods, in which coatings protecting the metallic coating it is desired to recover are quickly and easily removed without substantial accumulation of the outer coating in the form of a sludge.

The prior art has approached the problem of removing outer coatings, such as lacquer on tin plate, by providing a pretreatment bath to dissolve the outer coating but not the main coating. When such pretreatment baths were applied in separate process vessels, it was necessary not only to provide the required additional equipment, but also to take the time to pretreat the material, drain it, and transfer it to the stripping bath. When the pretreatment baths were applied in the same vessel as the stripping bath, it was necessary to take the time needed to pump in the pretreatment solution, immerse the material for a time sufficient to dissolve the outer coating, remove the pretreatment solution from the vessel and drain the treated material, in some cases rinse the material, and finally pump in the stripping solution.

Accordingly, a still further object of the present invention is the provision of such methods, in which an outer coating which may be insoluble in the stripping solution is nevertheless quickly removed in the same vessel and at the same time as the main coating.

Other objects, features and advantages of the present invention will become apparent from a consideration of the following description, taken in connection with the accompanying drawings, in which:

FIGURE 1 is an elevational view with parts broken away of apparatus with which the present invention may be practiced; and FIGURES 2 through 5 are diagrammatic views showing steps in the practice of the present invention.

Briefly, the present invention comprises the discovery that the above and other objects of the invention may be achieved by introducing the metal-coated material and the stripping solution into a container in such quantity as to leave a substantial portion of the container empty, rotating the container to tumble the material and solution, and maintaining substantially the same atmosphere unchanged within the empty portion of the container during the stripping operation by substantially precluding the entry of ambient air.

More specifically, with the container open and the axis of the container extending upward at a positive angle to the horizontal, which may include 90°, the metal-coated charge and the stripping solution are introduced in such quantity that the solution covers the charge and occupies preferably neither less than one-third nor more than one-half the volume of the container. A cover is then applied to close the container, the cover being provided with a plurality of openings therethrough which permit the passage of liquid but do not substantially impair the property of the cover of keeping the original atmosphere in the container unchanged during the stripping operation. The covered container is then rotated about an axis passing through the cover with that axis inclined to the horizontal at a positive acute angle less than 90° and preferably between 30° and 60°.

The container is provided with internal baffles or flights to aid in agitating the material and the solution; and as the container rotates, the material is lifted and dropped many times during the course of the stripping stage. As the quantity of solution is relatively small, the solution and material fall freely through the air within the container during the tumbling action. Air is continuously churned into the solution; but since the air within the container remains substantially unchanged during stripping, the carbon dioxide that can at most be introduced into the solution is limited to only that of the empty space of the container. The use of small quantities of stripping solution is thus enabled without excessive exposure to carbon dioxide.

The free fall of the material through the air during tumbling is not only permissible but also positively advantageous from a standpoint of removing outer coatings such as the lacquer on tin plate. This is because the falling pieces of material strike sharply against each other and break, jar, shatter and grind off the outer coating, thereby mechanically disintegrating it in a manner having no counterpart in a liquid medium. In this way, the use of a separate treatment step for the removal of outer coatings is avoided for the optimum conditions for stripping according to the present invention are also the optimum conditions for outer coating removal, and the two steps proceed simultaneously.

After the combined operation of stripping and removing the outer coating is completed, the container is drained by being turned about a horizontal axis until its axis of rotation is inclined at a negative acute angle to the horizontal smaller than −90° and preferably between −60° and −30°. It is essential that the perforated cover be still in place at this time. Preferably, the angle is chosen so that at least one opening through the container cover is below any other portion of the interior of the container, thereby to assure the most complete draining. It is important that the container be turned during draining to prevent retention of solution in the hollows of the material, and it is equally important that the negative angle of the axis of rotation about which the container turns during draining be smaller than −90° so as to continue the tumbling action for draining purposes. The importance of providing a plurality of spaced openings through the cover, rather than a single central opening, will now be apparent, for in this way it is possible to drain a rotating container without directing its opening straight down and thereby losing the tumbling effect.

With the stripping solution drained off, the container is righted again and the cover removed. Wash water is introduced, and the container is rotated about an axis disposed at a positive acute angle less than 90° to rinse the rich stripping solution from the material. With the cover on, the container is again rocked to the previous draining position, and the used rinse water is drained and if desired is retained for further rinsing operations. The rinsing operation is repeated as many times as needed to leave a substrate of the desired degree of freedom from coating material and to recover as much as desired of the stripped coating material. It is important that the container be rotated during draining of the rinse water between the washing steps, as this improves the washing efficiency and reduces the volume of wash water required, with corresponding savings in the cost of processing the wash water for metal recovery.

After the last rinse, the container is righted and the cover removed. The open container is then depressed until it opens downward, to discharge the stripped substrate into a waiting receptacle for removal. Preferably, the container is rotated while discharging stripped substrate, about a negative angle smaller than −90°, to assure discharge without clogging or sticking.

The container must be tipped sufficiently forward during the draining steps to permit gravity discharge of the liquid. However, it need not be tipped below the smallest angle at which a cover opening is lowermost, as the angle of repose of the aqueous stripping solution is practically zero. Moreover, the less the container is tipped for draining the greater the tendency of the internal flights or baffles to agitate the material. Hence, the smaller the negative draining angle, the better. But the angle of repose of the drained scrap is considerable, and also, the scrap may tend to lodge between the baffles. Therefore, the negative dumping angle of the container is preferably chosen to be larger than the negative draining angle thereof.

When an outer coating is removed, as for example lacquer, the rotation of the receptacle tends to keep the lacquer sludge in suspension in the liquid. A large proportion of the sludge is thus discharged with the liquid during draining and may easily be removed by filtration. The bulk of the remainder of the sludge is discharged with the stripped material during dumping. In any case, practically no sludge remains in the container, so that sludge accumulations of the prior art are avoided.

Apparatus by which the methods of the present invention may be practiced is shown in the accompanying drawings. A process vessel or container indicated generally at 1 comprises a pear-shaped shell 3 having a flat circular bottom wall 5 and an inclined truncated conical side wall 7 which merges upwardly into a cylindrical side wall 9 which in turn leads into a truncated conical upwardly converging side wall 11 terminating in a rather large open end 13. An annular steam jacket 15 encircles and is secured to cylindrical side wall 9, the upper end wall of steam jacket 15 being defined by an annular gear ring 17 which encircles and is secured to cylindrical side wall 9 at its top and is provided with a multiplicity of outwardly extending gear teeth. An annuar support ring 19 is secured to the outer side wall of steam jacket 15 intermediate its height and is in turn surrounded by an annular cradle 21 of hat-shaped cross sectional configuration which carries on its flanges and between its webs a plurality of rollers 23 disposed about horizontal and vertical axis to bear upon the horizontal and vertical upper and lower and side faces, respectively, of support ring 19.

A pair of diametrically oppositely spaced outwardly extending coaxial trunnions 25 are secured to opposite positions on the outermost portion of cradle 21 and are mounted for rotation about a horizontal axis in a pair of supports 27 one on either side of the process vessel. Thus, the trunnions 25 are carried by supports 27 and in turn carry cradle 21 which carries rollers 23 which carry support ring 19 which carries steam jacket 15 which carries the process vessel.

To rotate the process vessel about a horizontal axis, a gear segment 29 is fixedly secured to cradle 21 and one trunnion 25 and is concentric with its trunnion 25. A reversible electric motor 31 is driven by current supplied through wires 33 from a source of electric power (not shown), and is mounted on support 27 and carries a drive shaft and driven pinion (not shown) in mesh with gear segment 29. Upon actuation of motor 31, gear segment 29 is caused to revolve in either direction as desired thereby to rotate cradle 21 about the common axis of trunnions 25, and with it the process vessel.

To rotate the process vessel about its common axis with cradle 21, an electric motor 35 is provided which is mounted on cradle 21 and has a downwardly depending drive shaft terminating in a drive pinion 37 in mesh with the gear teeth of gear ring 17, so that upon actuation of electric motor 35 from a source of electric power (not shown), the process vessel will be caused to rotate within the cradle.

Steam for heating the process vessel is supplied from a source of steam (not shown) through a flexible steam line 39 to a manifold 41 mounted centrally of the bottom of the process vessel. Manifold 41 has a fixed portion 43 secured to the vessel and a rotatable portion 45 mounted for rotation on and coaxially of fixed portion 43. Steam is conducted from manifold 41 to the interior of steam jacket 15 by means of steam line 47 secured to and rotatable with the process vessel, while condensate from the steam is removed from the bottom of the jacket through a drain line 49 secured to the process vessel for rotation therewith and communicating with fixed portion 43 of manifold 41. A drain line 51 leads from rotatable portion 45 to a drain (not shown). Thus, steam line 39, rotatable portion 45 and drain line 51 swing with the process vessel but do not rotate with it; while fixed portion 43, steam line 47 and drain line 49 both swing and rotate with the vessel Hence, steam line 39 can be connected to a source or steam and can maintain that connection during rotation of the vessel.

The interior of shell 3 is provided with a number of flights or baffles 53 which radiate from the center of bottom wall 5 and extend up along side walls 7, 9 and 11 to opening 13. The purpose of these baffles is to tumble the material and the stripping solution during rotation of the shell so as to carry at least the material a considerable distance up around the walls of the container beyond the normal angle of repose of the material on what would otherwise be smooth container walls. In this way, the material is carried up about the container walls and dropped from a height on material below; and it is this falling of the material that is largely responsible for lacquer removal for the impact knocks off and abrades the lacquer or the like. Obviously, if the material were not carried up above the surface of the liquid in the container, there would be no such falling movement freely through the air and the impact of the falling material on the material below would be lost. Therefore, it will be appreciated that the baffles cooperate with the relatively low liquid level in the container to aid in removing undesired outer coatings from the coating it is desired to recover.

Open end 13 of the container is surrounded by an outwardly extending flange 55 on which is detachably fitted a cover 57. Cover 57 has a multiplicity of relatively small openings 59 therethrough. Cover 57 is foraminous rather than reticulated; that is, the area of the openings 59 is substantially less than half the area of the cover. It should also be noted that the outermost openings 59 through cover 57 are about in line with the extended contour of side wall 11, so that pockets of liquid will not be retained upon draining, as will be explained in greater detail hereinafter. Cover 57 may be removably held in place by means of toggle clamps 61, which may for example take the form shown in Patch Patent No. 2,668,437, February 9, 1954.

Steps in the method of the present invention are shown diagrammatically in FIGURES 2 through 5. As shown in FIGURE 2, the charge 63 of tin-plated scrap is introduced in the container when the container is upright with the cover removed. A hopper car 65 traveling on an overhead rail 67 carries the charge above the container and drops it into the container through the open upper end thereof. The container may, for example, have a greatest diameter of 19 feet and an opening diameter of 11 feet and a total capacity of about 3500 cubic feet. A charge of, say 45,000 pounds of scrap may be introduced.

The next step is to fill the container only partly with stripping solution. For tin-plated scrap, for example, the stripping solution may contain about 120 to 150 grams per liter (g./l.) of sodium hydroxide and about 10 to 50 g./l. of sodium nitrate. In place of the sodium compounds, the corresponding potassium compounds may also be used. Other oxidizing agents in place of the nitrates are sodium chromate or dichromate and sodium nitrite. While detinning solution 69 in the container and cover 57 closing the container and the container with its axis of rotation inclined, for example, at 45° to the horizontal, the container is rotated about the axis of the steam jacket, which passes through cover 57. This rotation to tumble the material in the stripping solution may continue, for example, for two to three hours, and in the case of the 19-foot container previously described, may proceed at a rate of, say, 1 r.p.m., as shown in FIGURE 3. During this period steam is introduced into jacket 15 in such quantities as to maintain the process temperature at about 200° F.

At the end of the stripping operation, the container with the cover still in place is rocked about trunnions 25 by actuation of motor 31 until it is in the position shown in FIGURE 4, in which position the stripping solution drains through openings 59 into a receptor 71 whence it flows by gravity into stripping solution and wash water tanks 73. The angle of the container axis of rotation during draining is about —45° as seen in FIGURE 4; but the most important relationship of the parts during draining is that convergent conical side wall 11 be either horizontal or somewhat downwardly declined toward open end 13 of the container. This orientation, coupled with the positioning of the outermost openings 59 at least as far out as the extended contour of side walls 11, insures the most complete draining of the stripped scrap. The rotation of the container about its axis of rotation continues during draining; and hence successive openings 59 become the lowermost draining openings.

The container is then righted again and rinse water introduced, and a rinse cycle is performed in which the container rotates in the position of FIGURE 3, whereafter it is again downwardly depressed and drained. The rinse water is sufficiently rich in the desired coating material to be worth saving. As many rinse cycles may be performed as are needed. As noted above, it is important that the container be rotated during draining of the rinse water; and this reduces the number of rinse cycles, reduces the rinse time, and reduces the quantity of rinse water and must be treated for metal recovery.

When the stripping and rinsing solutions become rich in the desired coating material, they are treated for the removal thereof, as by precipitation, evaporation, electrowinning, or the like. In case of tinplate, the tin may be recovered either as the metal or the stannate, for example, by the methods of Smith Patent No. 2,011,305, August 13, 1935.

The final step is unloading the stripped scrap after draining the last rinse water. The container with the drained scrap is righted and the cover removed. The container has been reinverted to the position of FIGURE 5 and the drained stripped scrap is dumped into the car 75 movable along rails 77 or into a suitable pit. The container is also rotated during discharge of the scrap and its axis is inclined downwardly at an angle of, say, $-60°$, to aid in discharge of the scrap. When righted again, the container is ready to begin a new cycle; and it will be noted that during the entire cycle the movement of the container was limited to rotation about a vertically swinging axis. To enable selective draining into receptor 71 or dumping into car 75 without bodily movement of the container, receptor 71 is provided with a conventional movable mounting (not shown).

From a consideration of the foregoing disclosure, it will be obvious that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A hydrometallurgical process for recovering metallic coating from coated material, comprising the steps of introducing the material and a caustic stripping solution into a container, closing the container with a multi-perforate cover, rotating the container about an axis inclined at a positive acute angle to the horizontal to tumble the material and solution within the container to strip the metallic coating from the material, the axis extending upwardly out of the container through the cover, swinging the container about an axis transverse to the axis of rotation until the axis of rotation is inclined downward at a negative acute angle to the horizontal to drain off the stripping solution through the cover while leaving the material in the container, and rotating the container about said axis of rotation during draining.

2. A process as claimed in claim 1, and righting the drained container, introducing rinse liquid into the container, rotating the container about an axis inclined about a positive acute angle to the horizontal, again swinging the axis of rotation downwardly to a negative acute angle with the horizontal with the cover on, to repeat the draining step, and again rotating the container during draining.

3. A process as claimed in claim 1, and recovering metallic coating material from the drained-off liquids.

4. A method of recovering tin from tin-coated material, comprising the steps of introducing tin-coated material and an aqueous caustic detinning solution into a container, closing the container with a multi-perforate cover, rotating the container about an axis inclined at a positive acute angle to the horizontal to tumble the material and solution within the container to strip the tin from the material, the axis extending upwardly out of the container through the cover, swinging the container about an axis transverse to the axis of rotation until the axis of rotation is inclined downward at a negative acute angle to the horizontal to drain off the detinning solution through the cover while leaving the material in the container, and rotating the container about said axis of rotation during draining.

5. A method as claimed in claim 4, and righting the drained container, introducing rinse liquid into the container, rotating the container about an axis inclined at a positive acute angle to the horizontal, again swinging the axis of rotation downward to a negative acute angle with the horizontal with the cover on, to repeat the draining step, and again rotating the container during draining.

6. A method as claimed in claim 4, and recovering tin from the drained-off liquids.

References Cited in the file of this patent

UNITED STATES PATENTS

| 1,460,731 | Pickop | July 3, 1923 |
| 1,511,590 | Buttfield | Oct. 14, 1924 |
| 1,863,029 | Piispanen | June 14, 1932 |
| 2,391,634 | Lewis et al. | Dec. 25, 1945 |
| 2,762,620 | Miehe | Sept. 11, 1956 |

FOREIGN PATENTS

| 114,336 | Australia | Dec. 18, 1941 |